US012789164B2

(12) United States Patent
Nakata et al.

(10) Patent No.: US 12,789,164 B2
(45) Date of Patent: Nov. 10, 2026

(54) OXYGEN SCAVENGER COMPOSITION, OXYGEN SCAVENGER PACKAGE, AND METHOD FOR MANUFACTURING OXYGEN SCAVENGER PACKAGE

(71) Applicant: MITSUBISHI GAS CHEMICAL COMPANY, INC., Tokyo (JP)

(72) Inventors: Takashi Nakata, Tokyo (JP); Masao Someya, Tokyo (JP); Keisuke Watanabe, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 234 days.

(21) Appl. No.: 18/845,609

(22) PCT Filed: Mar. 16, 2023

(86) PCT No.: PCT/JP2023/010253
§ 371 (c)(1),
(2) Date: Sep. 10, 2024

(87) PCT Pub. No.: WO2023/182129
PCT Pub. Date: Sep. 28, 2023

(65) Prior Publication Data

US 2025/0186965 A1 Jun. 12, 2025

(30) Foreign Application Priority Data

Mar. 22, 2022 (JP) ................................ 2022-045663

(51) Int. Cl.

| | |
|---|---|
| ***B01J 20/28*** | (2006.01) |
| ***B01J 20/02*** | (2006.01) |
| ***B01J 20/30*** | (2006.01) |
| ***B01J 20/32*** | (2006.01) |
| ***B65D 81/26*** | (2006.01) |

(52) U.S. Cl.
CPC ..... *B01J 20/0229* (2013.01); *B01J 20/28004* (2013.01); *B01J 20/28016* (2013.01); *B01J 20/2805* (2013.01); *B01J 20/28059* (2013.01); *B01J 20/3092* (2013.01); *B01J 20/3204* (2013.01); *B01J 20/3236* (2013.01); *B01J 20/3293* (2013.01); *B65D 81/268* (2013.01)

(58) Field of Classification Search
CPC .......................... A23B 2/717; B01J 20/28057
See application file for complete search history.

(56) References Cited

U.S. PATENT DOCUMENTS

| | | | |
|---|---|---|---|
| 2009/0159846 | A1 | 6/2009 | Sugimoto et al. |
| 2019/0083955 | A1 | 3/2019 | Sugimoto et al. |
| 2022/0226799 | A1 | 7/2022 | Sato et al. |
| 2023/0264168 | A1 | 8/2023 | Sato et al. |

FOREIGN PATENT DOCUMENTS

| | | | | |
|---|---|---|---|---|
| CN | 112314837 | | 2/2021 | |
| JP | 2020-192485 | A | 12/2020 | |
| WO | 2007/046449 | | 4/2007 | |
| WO | 2017/169015 | A1 | 10/2017 | |
| WO | WO 2020241378 | A1 * | 12/2020 | ............. A23B 2/717 |
| WO | 2022/004740 | A1 | 1/2022 | |

* cited by examiner

*Primary Examiner* — Khanh T Nguyen
(74) *Attorney, Agent, or Firm* — GREENBLUM & BERNSTEIN, P.L.C.

(57) ABSTRACT

There is provided an oxygen scavenger composition comprising iron, a metal salt and water, wherein the content of water per unit surface area of the iron present on the surface of the iron, [the content of water present on the surface of the iron] (g)/{the content of the iron (g)×the specific surface area of the iron ($m^2/g$)}], is 0.60 $g/m^2$ or more and 2.00 $g/m^2$ or less.

12 Claims, No Drawings

OXYGEN SCAVENGER COMPOSITION, OXYGEN SCAVENGER PACKAGE, AND METHOD FOR MANUFACTURING OXYGEN SCAVENGER PACKAGE

TECHNICAL FIELD

The present invention relates to an oxygen scavenger composition, an oxygen scavenger package and a method for producing the oxygen scavenger package.

BACKGROUND ART

A method of using an oxygen scavenger is known as a storage technique for food products, pharmaceutical products, and the like. In this method, an article to be stored and the oxygen scavenger are enclosed and hermetically sealed in a sealed container having a gas-barrier property, whereby oxygen in the sealed container is absorbed by the oxygen scavenger and the atmosphere in the sealed container can be kept substantially in an oxygen-free state. As the function of the oxygen scavenger, the oxygen scavenger needs to be small in size and to absorb much oxygen. In other words, there is required an oxygen scavenger composition capable of a large amount of oxygen absorption per unit volume.

Typical oxygen scavengers include iron-based oxygen scavengers containing iron (iron powder) as their main agent and non-iron-based oxygen scavengers containing ascorbic acid, glycerol or the like as their main agent. Oxygen scavengers are suitably selected according to applications, but iron-based oxygen scavengers, from the viewpoint of the oxygen absorption performance, are broadly used.

In such a situation, there are made attempts of size reduction and improvement in the amount of oxygen absorption of iron-based oxygen scavengers.

For example, PTL1 discloses an oxygen scavenger composition which contains an oxygen absorbing substance, water and a swelling agent, and has a reduced volume and a compact size achieved by being pressure-molded into a solid form to eliminate gaps between powdery/granular material.

Then, PTL2 discloses, with an object to provide an oxygen scavenger composition excellent in the amount of oxygen absorption, the oxygen scavenger composition containing a powdery/granule material having an $\alpha$ layer containing a water retention agent, a swelling agent, a metal salt and water, a $\beta$ layer containing iron and a $\gamma$ layer containing a porous carrier, wherein the powdery/granule material has a layer structure having the $\alpha$ layer, the $\beta$ layer and the $\gamma$ layer in this order from the inner side toward the outer side of the powdery/granule material.

CITATION LIST

Patent Literature

PTL1: International Publication No. WO2007/046449

PTL2: International Publication No. WO2017/169015

SUMMARY OF INVENTION

Technical Problem

Then, in use of an oxygen scavenger, from the viewpoint of effectively preventing oxidation of an article to be stored in a sealed container, it is desirable that the atmosphere in the sealed container is brought close to an oxygen-free state as quickly as possible. Hence, an oxygen scavenger composition used for iron-based oxygen scavengers is demanded which is high in the oxygen absorption rate in the reaction initial stage and can exhibit a high oxygen absorption performance.

Then, the present invention has an object to provide an oxygen scavenger composition which is high in the oxygen absorption rate in the reaction initial stage and can exhibit a high oxygen absorption performance, an oxygen scavenger package, and a method for producing an oxygen scavenger package.

Solution to Problem

More specifically, the gist of the present invention is as follows.

[1] An oxygen scavenger composition, comprising iron, a metal salt and water,
 wherein the content of water per unit surface area of the iron present on the surface of the iron, [the content of water present on the surface of the iron (g)/{the content of the iron (g)×the specific surface area of the iron ($m^2/g$)}], is 0.60 $g/m^2$ or more and 2.00 $g/m^2$ or less.

[2] The oxygen scavenger composition according to the above [1], wherein at least a part of the metal salt is present on the surface of the iron.

[3] The oxygen scavenger composition according to the above [2], wherein the metal salt present on the surface of the iron is disposed so as to coat the surface of the iron.

[4] The oxygen scavenger composition according to the above [2] or [3], wherein the metal salt present on the surface of the iron is one or more selected from the group consisting of calcium chloride, sodium chloride, calcium bromide and sodium bromide.

[5] The oxygen scavenger composition according to any one of the above [2] to [4], wherein the content of the metal salt present on the surface of the iron is, with respect to 100 parts by mass of the iron, 0.1 part by mass or more and 5.0 parts by mass or less.

[6] The oxygen scavenger composition according to any one of the above [1] to [5], wherein the specific surface area of the iron is 0.03 $m^2/g$ or more and 0.20 $m^2/g$ or less.

[7] The oxygen scavenger composition according to any one of the above [1] to [6], wherein the average particle diameter (D50) of the iron is 1 μm or more and 1,000 μm or less.

[8] An oxygen scavenger package, comprising an oxygen scavenger composition according to any one of the above [1] to [7], and an air-permeable packaging container in which the oxygen scavenger composition is accommodated.

[9] A method for producing an oxygen scavenger package, comprising the following steps (I) to (III):

step (I): a step of obtaining an oxygen scavenger composition (a) containing a metal salt and iron;

step (II): a step of supplying water to the oxygen scavenger composition (a) and obtaining an oxygen scavenger composition (A) containing the iron, the metal salt and water, wherein the content of water per unit surface area of the iron present on the surface of the iron, [the content of water present on the surface of the iron (g)/{the content of the iron (g)×the specific surface area of the iron ($m^2/g$)}], is 0.60 $g/m^2$ or more and 2.00 $g/m^2$ or less; and step (III): a step of accommodating at least one of the oxygen scavenger composition (a) and the oxygen scavenger composition (A) in an air-permeable packaging container (b1).

[10] The method for producing an oxygen scavenger package according to the above [9], comprising, following the above step (I), the following step (III-I) and step (II-1) in this order:

step (III-1): a step of accommodating the oxygen scavenger composition (a) in the air-permeable packaging container (b1); and step (II-1): a step of supplying water to the oxygen scavenger composition (a) through the air-permeable packaging container (b1) and obtaining the oxygen scavenger composition (A).

[11] The method for producing an oxygen scavenger package according to the above [10], further comprising the following step (IV-1):

step (IV-1): a step of further accommodating the air-permeable packaging container (b1) in which the oxygen scavenger composition (A) is accommodated into a gas barrier container (b2).

[12] The method for producing an oxygen scavenger package according to the above [9], comprising, following the above step (I), the following step (III-2), step (IV-2) and step (II-2) in this order:

step (III-2): a step of accommodating the oxygen scavenger composition (a) and a moisture imparting agent in the air-permeable packaging container (b1);

step (IV-2): a step of further accommodating the air-permeable packaging container (b1) in which the oxygen scavenger composition (a) and the moisture imparting agent are accommodated into the gas barrier container (b2); and step (II-2): a step of supplying water from the moisture imparting agent to the oxygen scavenger composition (a), and obtaining the oxygen scavenger composition (A).

Advantageous Effects of Invention

According to the present invention, there can be provided the oxygen scavenger composition which has a high oxygen absorption rate in the reaction initial stage and can exhibit a high oxygen absorption performance, the oxygen scavenger package, and the method for producing an oxygen scavenger package.

DESCRIPTION OF EMBODIMENTS

Embodiments of the oxygen scavenger composition, the oxygen scavenger package and the method for producing an oxygen scavenger package according to the present invention will be described in detail hereinafter.

Here, in the present description, the term, "A to B", related to numerical values means "A or more and B or less" (in the case of A<B) or "A or less and B or more" (in the case of A>B). Further in the present invention, combinations of preferable aspects are more preferable aspects.

Oxygen Scavenger Composition

The oxygen scavenger composition of the present invention contains iron, a metal salt and water, wherein the content of water per unit surface area of the iron present on the surface of the iron, [the content of water present on the surface of the iron (g)/{the content of the iron (g)×the specific surface area of the iron ($m^2$/g)}], is 0.60 g/$m^2$ or more and 2.00 g/$m^2$ or less.

Here, in the present description, the "content of water per unit surface area of the iron present on the surface of the iron" is an index of the "thickness of a water film formed on the surface of the iron", and, when the "content of water per unit surface area of the iron present on the surface of the iron" is in the above predetermined range, means that the water film having a predetermined thickness is formed on the surface of the iron.

The oxygen scavenger composition of the present invention, due to the above constitution, can raise the oxygen absorption rate in the reaction initial stage and can exhibit a high oxygen absorption performance.

The reason for that the oxygen scavenger composition of the present invention attains the above effect is not clear, but is presumed as follows.

First, in an iron-based oxygen scavenger, the iron reacts with water and oxygen to cause a fast oxygen scavenging reaction.

With regard to water, there are a case (moisture-dependent type) of using water vapor (moisture or the like transpired from a stored article or the like) in the environment to be deoxidized and a case (self-reacting type) where a moisture carrier (moisture imparting agent or the like) is simultaneously in advance packaged in an oxygen scavenger package. In either case, in order for the iron to absorb oxygen, moisture needs to be taken in on the surface of the iron, and for that, the deliquescence phenomenon of the metal salt is utilized.

The present inventors have further made reaction analysis on the oxygen absorption of the iron, and it is inferred that the reaction is not a direct reaction of the iron with water in a gas state (water vapor) and oxygen, but has a reaction mechanism in which first, a water film is formed on the surface of the iron by the deliquescence phenomenon of the metal salt, and water and dissolved oxygen in the water film react with the iron.

Further in the above mechanism, in the case where the thickness of the water film is small, it is conceivable that due to a shortage of water on the surface of the iron, the amount of oxygen absorption is small and when moisture is consumed to the minimum amount, the reaction rate becomes slow. On the other hand, in the case where the thickness of the water film is large, it is conceivable that due to the diffusion control making the dissolved oxygen concentration in the water film low, the oxygen scavenging reaction rate becomes slow.

In the oxygen scavenger composition of the present invention, it is conceivable that by in advance forming the water film having a predetermined thickness on the surface of the iron, suitable moisture and oxygen (dissolved oxygen) can be supplied to the surface of the iron from the initial stage of the oxygen scavenging reaction, and the oxygen scavenging reaction rate and the amount of oxygen absorption can be raised, whereby a high oxygen absorption performance can be exhibited.

Hereinafter, each component and the like will be described.

Iron

The shape of the iron contained in the oxygen scavenger composition of the present invention is not especially limited, but is, from the viewpoint of the oxygen absorption performance, the easy availability and the easy handleability, preferably an iron powder. The iron powder is preferably one in which the surface of iron (0-valent metallic iron) is exposed, but in the range of not inhibiting the advantageous effects of the present invention, may be one having an ultrathin oxide film like usual metal surfaces. Specifically, reduced iron powder, electrolytic iron powder, atomized iron powder and the like can suitably be used. Further, pulverized products and cutting chips of cast iron or the like can also be used.

The iron powder can be used singly in one kind, or as required, in combination of two or more kinds. These iron powders are easily available as commercial products and can also be used.

The average particle diameter (D50) of the iron powder is, from the viewpoint of making good the contact with oxygen, preferably 3,000 μm or less, more preferably 1,000 μm or less, and still more preferably 300 μm or less, and is, from the viewpoint of suppressing generation of dusts, preferably 1 μm or more, more preferably 10 μm or more, and still more preferably 20 μm or more. More specifically, the average particle diameter (D50) of the iron powder is preferably 1 μm or more and 3,000 μm or less, more preferably 1 μm or more and 1,000 μm or less, still more preferably 10 μm or more and 1,000 μm or less and further still more preferably 20 μm or more and 300 μm or less.

Then, the iron powder whose average particle diameter is in the above range can be procured by suitably selecting a commercially available iron powder. The iron powder can also be procured, for example, by classifying an iron powder into a desired average particle diameter by using a sieve.

Here, the average particle diameter can be measured as an average particle diameter (D50) at a cumulative frequency of 50% in a volume-based particle size distribution, for example, by a commercially available laser diffraction scattering type particle size distribution analyzer (LA-960, manufactured by HORIBA Ltd.).

The specific surface area of the iron powder is, from the viewpoint of the oxygen absorption performance, preferably 0.03 $m^2/g$ or more and more preferably 0.05 $m^2/g$ or more, and is, from the viewpoint of suppressing generation of dusts, preferably 0.20 $m^2/g$ or less, more preferably 0.10 $m^2/g$ or less, and still more preferably 0.09 $m^2/g$ or less. More specifically, the specific surface area of the iron powder is preferably 0.03 $m^2/g$ or more and 0.20 $m^2/g$ or less, more preferably 0.03 $m^2/g$ or more and 0.10 $m^2/g$ or less, and still more preferably 0.05 $m^2/g$ or more and 0.09 $m^2/g$ or less.

Here, the specific surface area of the iron powder can be measured by the BET multipoint method. Specifically, the specific surface area can be measured by a method described in Examples.

The oxygen scavenger composition of the present invention contains the iron as a main agent. The content of the iron in the oxygen scavenger composition is not especially limited, but is preferably 40% by mass or more and 98% by mass or less, more preferably 60% by mass or more and 98% by mass or less, still more preferably 80% by mass or more and 98% by mass or less, further still more preferably 85% by mass or more and 96% by mass or less, and further still more preferably 85% by mass or more and 94% by mass or less.

Metal Salt

The metal salt contained in the oxygen scavenger composition of the present invention is a substance which catalytically acts on the oxidative reaction of the iron to improve the activity of the iron. Further, the metal salt plays a role of preventing water contained in the oxygen scavenger composition from transpiring and being lost from the oxygen scavenger composition.

Then, in the oxygen scavenger composition of the present invention, the water film having a predetermined thickness needs to be in advance formed on the surface of the iron, and in order to take in moisture on the surface of the iron, the deliquescence phenomenon of the metal salt is utilized. Hence, it is preferable that at least a part of the metal salt is present on the surface of the iron, and it is more preferable that the metal salt is present mainly on the surface of the iron.

Here, "at least a part of the metal salt is present on the surface of the iron" means that a part of or the entire of the metal salt contained in the oxygen scavenger composition is present on the surface of the iron. The oxygen scavenger composition of the present invention, as described later, may contain a moisture imparting agent, and although there is a case where the moisture imparting agent contains the metal salt, since the metal salt is carried on a carrier of the moisture imparting agent, the metal salt is distinguished from the metal salt present on the surface of the iron. Therefore, in the case where the oxygen scavenger composition contains the moisture imparting agent, it suffices if a part of the metal salt is present on the surface of the iron, and the rest may be carried on the carrier of the moisture imparting agent.

Then, "the metal salt is present mainly on the surface of the iron" includes, for example, a case where a component containing the metal salt, such as the moisture imparting agent, is not blended in the oxygen scavenger composition, and means the case where substantially the entire of the metal salt is present on the surface of the iron.

Then, it is preferable that the metal salt present on the surface of the iron is disposed so as to coat the surface of the iron. Here, a method of coating the metal salt on the surface of the iron is not especially limited, but for example, as described later, the coating can be carried out by mixing an iron powder and an aqueous solution containing the metal salt, and drying the resultant to remove moisture to thereby cause the metal salt to be deposited on the surface of the iron powder.

The metal salt is not especially limited, but is preferably a metal salt having deliquescence. Particularly, a metal halide is preferable. As the metal halide, any one can be used without particular limitation as long as being a usually known one.

A metal in the metal halide is not especially limited, but examples thereof include one or more selected from the group consisting of alkali metals, alkaline earth metals, copper, zinc, aluminum, tin, iron, cobalt and nickel. Among these, more preferable is one or more selected from the group consisting of lithium, potassium, sodium, magnesium, calcium, barium and iron; and still more preferable is one or more selected from the group consisting of sodium and calcium.

The halide of the metal halide is not especially limited, but examples thereof include chlorides, bromides and iodides, and is preferably one or more selected from the group consisting of chlorides and bromides.

The metal halide is, from the viewpoint of handleability, safety and the like, preferably one or more selected from the group consisting of calcium chloride, sodium chloride, calcium bromide, sodium bromide, calcium iodide and sodium iodide, and more preferably one or more selected from the group consisting of calcium chloride, sodium chloride, calcium bromide and sodium bromide.

In particular, the metal salt present on the surface of the iron is preferably one or more selected from the group consisting of calcium chloride, sodium chloride, calcium bromide and sodium bromide.

The metal salt can be used singly in one kind, or as required, can be used in combination of two or more kinds. These metal salts are easily available as commercial products, and can be used.

The content of the metal salt is not especially limited, but is, in the oxygen scavenger composition, preferably 0.09% by mass or more and 10% by mass or less, more preferably 0.09% by mass or more and 5.0% by mass or less and still more preferably 0.10% by mass or more and 2.0% by mass or less. Further, the content of the metal salt is, in the oxygen scavenger composition except the moisture imparting agent, preferably 0.09% by mass or more and 5.0% by mass or less, more preferably 0.10% by mass or more and 2.0% by mass or less and still more preferably 0.10% by mass or more and 1.0% by mass or less. Further, the content of the metal salt is, with respect to 100 parts by mass of the iron, preferably 0.1 part by mass or more and 5.0 parts by mass or less, more preferably 0.1 part by mass or more and 2.0 parts by mass or less, still more preferably 0.1 part by mass or more and 1.0 part by mass or less and further still more preferably 0.2 part by mass or more and 1.0 part by mass or less.

Then, the content of the metal salt present on the surface of the iron is, with respect to 100 parts by mass of the iron, preferably 0.1 part by mass or more and 5.0 parts by mass or less, more preferably 0.1 part by mass or more and 2.0 parts by mass or less, still more preferably 0.1 part by mass or more and 1.0 part by mass or less and further still more preferably 0.1 part by mass or more and 0.5 part by mass or less.

Water

The water contained in the oxygen scavenger composition of the present invention is a component necessary for progressing the oxygen scavenging reaction.

Then, the oxygen scavenger composition of the present invention needs to in advance form the water film having a predetermined thickness on the surface of the iron, and it is conceivable that at this time, water is taken in the metal salt present on the surface of the iron by the deliquescence phenomenon of the metal salt. Hence, it is preferable that at least a part of the water is present on the surface of the iron together with the metal salt, and it is more preferable that the water is present mainly on the surface of the iron together with the metal salt.

Here, "at least a part of the water is present on the surface of the iron" means that a part of or the entire of the water contained in the oxygen scavenger composition is present on the surface of the iron. The oxygen scavenger composition of the present invention, as described later, may contain a moisture imparting agent, and the moisture imparting agent contains water, but since the water is carried on a carrier of the moisture imparting agent, the water is distinguished from the water present on the surface of the iron. Therefore, in the case where the oxygen scavenger composition contains the moisture imparting agent, it suffices if a part of the water is present on the surface of the iron, and the rest may be carried on the carrier of the moisture imparting agent.

Then, "the water is present mainly on the surface of the iron" includes, for example, a case where a component containing water, such as the moisture imparting agent, is not blended in the oxygen scavenger composition, and means the case where substantially the entire of the water is present on the surface of the iron.

Then, it is more preferable that the water present on the surface of the iron is disposed so as to coat the surface of the iron together with the metal salt.

In the oxygen scavenger composition of the present invention, by controlling the thickness of the water film formed on the surface of the iron at a predetermined thickness, the oxygen absorption rate in the reaction initial stage can be made fast and a high oxygen absorption performance can be exhibited. Here, the thickness of the water film can use, as an index, the content of water per unit surface area of the iron present on the surface of the iron.

The content of water per unit surface area of the iron present on the surface of the iron, [the content of water present on the surface of the iron (g)/{the content of the iron (g)×the specific surface area of the iron ($m^2/g$)}], is 0.60 $g/m^2$ or more and 2.00 $g/m^2$ or less. When the content of water per unit surface area of the iron present on the surface of the iron is less than 0.60 $g/m^2$, it is conceivable that due to a shortage of water, the amount of oxygen absorption reduces. Then, when the content of water per unit surface area of the iron present on the surface of the iron exceeds 2.00 $g/m^2$, it is conceivable that since the water film is too thick, due to a decrease in the dissolved oxygen concentration in the water film (the diffusion control), the oxygen absorption rate in the reaction initial stage becomes slow. The content of water per unit surface area of the iron present on the surface of the iron is preferably 0.70 $g/m^2$ or more and 2.00 $g/m^2$ or less, more preferably 1.10 $g/m^2$ or more and 2.00 $g/m^2$ or less, still more preferably 1.10 $g/m^2$ or more and 1.98 $g/m^2$ or less and further still more preferably 1.50 $g/m^2$ or more and 1.90 $g/m^2$ or less.

A method of controlling the content of water per unit surface area of the iron present on the surface of the iron, [the content of water present on the surface of the iron] (g)/{the content of the iron (g)×the specific surface area of the iron ($m^2/g$)}], in a predetermined range is not especially limited, but the thickness of the water film can be controlled at a desired thickness, for example, (1) by suitably selecting a method of supplying water to the surface of the iron and the condition thereof (atmospheric humidity and humidity of the moisture imparting agent), or (2) by suitably selecting the type of the metal salt present on the surface of the iron and regulating the content thereof. In particular, since when moisture is taken in on the surface of the iron, the deliquescence phenomenon of the metal salt is utilized, for example, in the case of the control by the humidity condition, it is conceivable that the higher the humidity, the more the content of water per unit surface area of the iron present on the surface of the iron, [the content of water present on the surface of the iron (g)/{the content of the iron (g)×the specific surface area of the iron ($m^2/g$)}], can be raised. Then, in the case of the control by the above (2) method, it is conceivable that the more the content of the metal salt present on the surface of the iron, the more the content of water per unit surface area of the iron present on the surface of the iron, [the content of water present on the surface of the iron (g)/{the content of the iron (g)×the specific surface area of the iron ($m^2/g$)}], can be raised. Generally, since the humidity condition often cannot be regulated optionally, the control by the method of the above (2) is more preferable.

The content of water in the oxygen scavenger composition is not especially limited, but is preferably 2.0% by mass or more and 30% by mass or less, more preferably 3.0% by mass or more and 20% by mass or less, still more preferably 4.0% by mass or more and 15% by mass or less and further still more preferably 7.0% by mass or more and 14% by mass or less. Further, the content of water is, in the oxygen scavenger composition except the moisture imparting agent, preferably 3.0% by mass or more and 20% by mass or less, more preferably 4.0% by mass or more and 15% by mass or less and still more preferably 7.0% by mass or more and 14% by mass or less.

Further, the content of water is, from the viewpoint of the oxygen absorption performance, with respect to 100 parts by mass of the iron, preferably 2.0 parts by mass or more and 30 parts by mass or less, more preferably 3.0 parts by mass or more and 20 parts by mass or less, still more preferably 4.0 parts by mass or more and 19 parts by mass or less and further still more preferably 7.0 parts by mass or more and 17 parts by mass or less.

Further, the content of water present on the surface of the iron is, with respect to 100 parts by mass of the iron, preferably 3.0 parts by mass or more and 20 parts by mass or less, more preferably 4.0 parts by mass or more and 19 parts by mass or less, still more preferably 7.0 parts by mass or more and 17 parts by mass or less and further still more preferably 8.0 parts by mass or more and 16 parts by mass or less.

Moisture Imparting Agent

The oxygen scavenger composition of the present invention can further contain the moisture imparting agent. The moisture imparting agent is a carrier impregnated with moisture (moisture carrier), and supplies moisture to the iron.

It is preferable that the moisture imparting agent contains a carrier, a metal salt and water.

The carrier suffices if being able to supply moisture carried on the carrier to the iron, and suitably used are generally a granular material of zeolite, fired diatomaceous earth, silica gel, perlite, vermiculite, active alumina, activated clay, active carbon, bentonite and the like; among these, preferable are zeolite, fired diatomaceous earth and active carbon.

As the metal salt, the above-mentioned component can be used, but preferably used is sodium chloride.

In the case where the oxygen scavenger composition of the present invention contains the moisture imparting agent, the content of the moisture imparting agent is not especially limited, and suffices if being able to supply a necessary amount of moisture, and is, for example, in the oxygen scavenger composition, preferably 15% by mass or more and 60% by mass or less and more preferably 30% by mass or more and 50% by mass or less. Further, the content of the moisture imparting agent is, with respect to 100 parts by mass of the iron, preferably 25 parts by mass or more and 100 parts by mass or less and more preferably 40 parts by mass or more and 60 parts by mass or less.

In the case where the oxygen scavenger composition of the present invention contains the moisture imparting agent, the content of the carrier is, in the oxygen scavenger composition, preferably 15 parts by mass or more and 60 parts by mass or less and more preferably 30 parts by mass or more and 50 parts by mass or less. Further, the content of the carrier is, with respect to 100 parts by mass of the iron, preferably 20 parts by mass or more and 150 parts by mass or less, more preferably 25 parts by mass or more and 100 parts by mass or less and still more preferably 40 parts by mass or more and 60 parts by mass or less.

In the oxygen scavenger composition of the present invention, from the viewpoint of ease of the thickness control of the water film and size reduction of the oxygen scavenger package, it is preferable that moisture is supplied through moisture absorption from the outside, and in this case, the oxygen scavenger composition may substantially not contain the moisture imparting agent.

Other Components

The oxygen scavenger composition of the present invention may contain, in addition to the above components, as required, other components. The other components include alkaline substances, swelling agents, fluidity improvers, catalysts, odor absorbents and thermal dispersants.

Shape of the Oxygen Scavenger Composition

The shape of the oxygen scavenger composition of the present invention is not especially limited, but examples thereof include a spherical shape, a nearly spherical shape, an ellipsoidal shape and a columnar shape; and a spherical shape and a nearly spherical shape are preferable and a spherical shape is more preferable, because it is likely that these shapes are better in the filling property and are higher in the bulk density.

Method for Producing the Oxygen Scavenger Composition

A method for producing the oxygen scavenger composition of the present invention is not especially limited, but it is preferable that the method has, for example, the following steps (i) and (ii) in this order.

Step (i): a step of obtaining an oxygen scavenger composition (a) containing iron and a metal salt Step (ii): a step of supplying water to the oxygen scavenger composition (a) to obtain an oxygen scavenger composition (A) containing the iron and the metal salt and water, wherein the content of the water per unit surface area of the iron present on the surface of the iron, [the content of water present on the surface of the iron (g)/{the content of the iron (g)×the specific surface area of the iron ($m^2/g$)}], is 0.60 $g/m^2$ or more and 2.00 $g/m^2$ or less.

Step (i)

The step (i) is a step of obtaining an oxygen scavenger composition (a) containing iron and a metal salt.

The iron and the metal salt are as described above.

In the resulting oxygen scavenger composition (a), it is preferable that the metal salt is present on the surface of the iron, and it is more preferable that the metal salt is disposed so as to coat the surface of the iron. A method of obtaining such an oxygen scavenger composition (a) is not especially limited, but an iron powder having the metal salt deposited thereon may be obtained, for example, by mixing an iron powder with an aqueous solution of the metal salt and drying the resultant.

In the case of using, as a starting material, an aqueous solution of the metal salt, the concentration of the salt is preferably 1% by mass or more and 20% by mass or less and more preferably 2% by mass or more and 10% by mass or less. Due to that the concentration is in the above range, the iron powder and the metal salt aqueous solution become enabled to be homogeneously mixed, and the metal salt can be coated uniformly on the iron powder surface.

Step (ii)

The step (ii) is a step of supplying water to the oxygen scavenger composition (a) to obtain an oxygen scavenger composition (A) containing the iron and the metal salt and water, wherein the content of the water per unit surface area of the iron present on the surface of the iron, [the content of water present on the surface of the iron (g)/{the content of the iron (g)×the specific surface area of the iron ($m^2$/g)}], is 0.60 g/$m^2$ or more and 2.00 g/$m^2$ or less.

By the present step, the water film having a desired thickness can be formed on the surface of the iron, and the oxygen scavenger composition can be obtained which is fast in the oxygen absorption rate in the reaction initial stage and can exhibit a high oxygen absorption performance.

A method of supplying water to the oxygen scavenger composition (a) is not especially limited, but includes, for example, following methods.

First, (1) in the case where water is supplied through moisture absorption from the outside, there are included a method in which the oxygen scavenger composition (a) is allowed to stand in an atmosphere whose humidity is regulated at a predetermined one for a certain time to cause moisture to be absorbed, and a method in which a hydrous body (for example, moistened absorbent cotton) is brought into contact with the oxygen scavenger composition (a) to cause water to be supplied from the hydrous body to the oxygen scavenger composition (a). According to these methods, by suitably regulating the humidity and the standing time, and the water content and the contact time of the hydrous body, and the like, the water film having a desired thickness can be formed on the surface of the iron.

Then, (2) a method is also included in which the moisture carrier (such as moisture imparting agent) is further blended in the oxygen scavenger composition (a), and moisture is supplied from the moisture carrier to the oxygen scavenger composition (a). According to the present method, by regulating the amount of the moisture carrier, the content of moisture in the moisture carrier, and the like, the water film having a desired thickness can be formed on the surface of the iron. The oxygen scavenger composition (A) obtained by the present method contains, in addition to the iron, the metal salt and the water, substantially further the carrier.

In any case of the above methods, since when moisture starts being supplied to the oxygen scavenger composition (a), the oxygen scavenging reaction of the iron comes to progress, it is preferable that the step (ii) is carried out in an inert atmosphere, and further, it is preferable that the resulting oxygen scavenger composition (A) is stored in an inert atmosphere until being used as an oxygen scavenger.

A mixing apparatus for mixing the above each component is not especially limited, but as specific examples thereof, there can be used a ribbon mixer (manufactured by Ohno Chemical Machinery Co. Ltd.), a Nauta mixer (manufactured by Hosokawa Micron Corp.), a conical mixer (manufactured by Ohno Chemical Machinery Co. Ltd.), a vertical granulator (manufactured by Powrex Corp.), an SP granulator (manufactured by Dalton Corp.), a high-speed mixer (manufactured by Earthtechnica Co. Ltd.) and a granulator (manufactured by Akirakiko Co. Ltd.).

Oxygen Scavenger Package

The oxygen scavenger package of the present invention contains the above-mentioned oxygen scavenger composition and an air-permeable packaging container accommodating the oxygen scavenger composition.

Air-Permeable Packaging Container

The air-permeable packaging container is not especially limited as long as being a container composed of a packaging material to be used in oxygen scavenger applications, but from the viewpoint that the oxygen scavenger package exhibits a sufficient oxygen absorption performance, at least contains an air-permeable packaging material, and includes one in which two sheets of air-permeable packaging material are laminated to make a bag form, one in which one sheet of air-permeable packaging material and one sheet of non-air-permeable packaging material are laminated to make a bag form, and one in which one sheet of air-permeable packaging material is folded and edges except the folded portion are sealed to make a bag form. The air-permeable packaging container besides includes a container in which an air-permeable packaging material is affixed to an opening surface of a non-air-permeable stiff container.

Here, in the case where the air-permeable packaging material and the non-air-permeable packaging material are of a quadrilateral shape, examples of the air-permeable packaging container include one in which two sheets of air-permeable packaging material are superposed and four sides are heat sealed to make a bag form, one in which one sheet of air-permeable packaging material and one sheet of non-air-permeable packaging material are superposed and four sides are heat sealed to make a bag form, and one in which one sheet of air-permeable packaging material is folded and three sides except the folded portion are heat sealed to make a bag form. Further, the packaging material may also be one in which the air-permeable packaging material is made into a cylindrical shape and both ends and the trunk of the cylindrical body are heat sealed to make a bag form.

Air-Permeable Packaging Material

As the air-permeable packaging material, there are selected packaging materials which oxygen and water vapor can permeate. Among these, there is suitably used one which has an air resistance by a Gurley tester method of 600 seconds or less, more preferably 90 seconds or less, still more preferably 30 seconds or less. Here, the air resistance refers to a value measured by the method of JIS P8117:2009. More specifically, the air resistance refers to the time taken for 100 mL of air to permeate an air-permeable packaging material as measured by using a Gurley densometer (manufactured by Toyo Seiki Seisaku-sho Ltd.)

As the air-permeable packaging material, there can be used paper, nonwoven fabric and besides, ones in which the air permeability is imparted to a plastic film. As the plastic film, there can be used, for example, a laminated film and the like in which a film of polyethylene terephthalate, polyamide, polypropylene, polycarbonate or the like and a film, as a seal layer, of polyethylene, an ionomer, polybutadiene, an ethylene-acrylic acid copolymer, an ethylene-methacrylic acid copolymer, an ethylene-vinyl acetate copolymer or the like, are laminated and adhered. Further, laminated products of these can also be used as the air-permeable packaging material.

A method of imparting the air permeability can adopt, in addition to piercing machining using cold needles or hot needles, various types of methods. In the case where the air permeability is provided by piercing machining, the air permeability can optionally be regulated by the diameter and the number of perforations to be pierced, the material and the like.

It is preferable that the thickness of the laminated film is 50 to 300 μm; being 60 to 250 μm is especially preferable. In this case, as compared with the case where the thickness is out of the above range, the packaging material can be made one which holds the strength and is excellent in the heat sealability and the packaging suitability.

Non-Air-Permeable Packaging Material

As the non-air-permeable packaging material, a packaging material to be used in oxygen scavenger applications can be used, and a packaging material is suitable which can block moisture, alcohols, oils and solid components from stored articles, and has sealability. The non-air-permeable packaging material specifically includes laminates having an oxygen permeability of 0.05 to 20 $mL/m^2 \cdot 24$ hr atm (25° C., 50% RH) like polyethylene terephthalate or nylon-based co-extruded multilayer sheets or films.

Gas Barrier Container

The oxygen scavenger package of the present invention may have a gas barrier container further accommodating the above-mentioned air-permeable packaging container accommodating the oxygen scavenger composition. By accommodating the above-mentioned air-permeable packaging container in which the oxygen scavenger composition is accommodated into the gas barrier container, the air permeation from and to the outside can be blocked, and in particular, flowing-in of oxygen into the gas barrier container and flowing-out of water vapor therefrom can be prevented, and the oxygen absorption performance can well be maintained until the use time as an oxygen scavenger.

The gas barrier container is not especially limited as long as being capable of being hermetically sealed and substantially having gas barrier properties, but from the viewpoint of blocking the air permeation from and to the outside, it is preferable that the gas barrier container is constituted of the above non-air-permeable material.

Specifically, there can be used simply bags or packaging containers composed of laminates having an oxygen permeability of 0.05 to 20 $mL/m^2 \cdot 24$ hr atm (25° C., 50% RH), like multilayer sheets or films having lamination structures such as polyethylene terephthalate/aluminum deposition/polyethylene, stretched polypropylene/polyvinyl alcohol/polyethylene, and polyvinylidene chloride-coated stretched nylon/polyethylene, and nylon-based coextruded multilayer sheets or films.

As the gas barrier container, besides the above, metal cans, glass bottles, plastic containers and the like can also be used.

Method for Producing the Oxygen Scavenger Package

A method for producing the oxygen scavenger package is not especially limited, but is preferably a method comprising, for example, the following steps (I) to (III). According to such a method, the oxygen scavenger package which has a high oxygen absorption rate in the reaction initial stage and can exhibit a high oxygen absorption performance can be obtained. Then, the order of the following steps (II) and (III) does not matter.

Step (I): a step of obtaining an oxygen scavenger composition (a) containing a metal salt and iron;

Step (II): a step of supplying water to the oxygen scavenger composition (a) and obtaining an oxygen scavenger composition (A) containing the iron, the metal salt and water, wherein the content of water per unit surface area of the iron present on the surface of the iron, [the content of water present on the surface of the iron (g)/{the content of the iron (g)×the specific surface area of the iron ($m^2/g$)}], is 0.60 $g/m^2$ or more and 2.00 $g/m^2$ or less; and step (III): a step of accommodating at least one of the oxygen scavenger composition (a) and the oxygen scavenger composition (A) in an air-permeable packaging container (b1).

Steps (I) and (II)

The steps (I) and (II) are the same as the steps (i) and (ii) in the method for producing the oxygen scavenger composition.

Step (III)

The step (III) is a step of accommodating at least one of the oxygen scavenger composition (a) and the oxygen scavenger composition (A) in an air-permeable packaging container (b1).

Since this step is present, the oxygen scavenger composition (a) and the oxygen scavenger composition (A) can be accommodated in the air-permeable packaging container, and the oxygen scavenger package can be obtained in which the oxygen absorption rate in the reaction initial stage is fast and a high oxygen absorption performance can be exhibited.

Here, for the air-permeable packaging container (b1), the above-mentioned one can be used.

It is preferable that the above production method further comprises the following step (IV).

Step (IV): a step of further accommodating the air-permeable packaging container (b1) in which at least one of the oxygen scavenger composition (a) and the oxygen scavenger composition (A) is accommodated into a gas barrier container.

Since the above step (IV) is present, the air-permeable packaging container (b1) accommodating at least one of the oxygen scavenger composition (a) and the oxygen scavenger composition (A) can further be accommodated in a gas barrier container (b2), and flowing-in of oxygen and water vapor into the inside of the gas barrier container can be blocked. Hence, the oxidation of the iron can be suppressed and the amount of moisture on the surface of the iron can suitably be controlled.

In particular, the present step is suitable in the case where the air-permeable packaging container (b1) accommodates the oxygen scavenger composition (A). Since, in the oxygen scavenger composition (A), the water film is already formed, the oxygen scavenging reaction slowly progresses in the presence of oxygen. Hence, from the viewpoint of maintaining good oxygen absorption performance until the use time as an oxygen scavenger, the present step is effective.

In the case where the air-permeable packaging container (b1) accommodating at least one of the oxygen scavenger composition (a) and the oxygen scavenger composition (A) is further accommodated in the gas barrier container (b2), it is preferable that the inside of the gas barrier container (b2) is substantially made to be a hermetically closed system, and it is more preferable that the inside of the system is made to be an oxygen-free reductive atmosphere.

Specific examples of the above production method includes the following methods 1 and 2.

Method 1

A method 1 is preferably one comprising, following the above step (I), the following step (III-1) and step (II-1) in this order.

Step (III-1): a step of accommodating the oxygen scavenger composition (a) in the air-permeable packaging container (b1)

Step (II-1): a step of supplying water through the air-permeable packaging container (b1) to the oxygen scavenger composition (a) and obtaining the oxygen scavenger composition (A)

The step (III-1) corresponds to the above step (III), and is a step of accommodating the oxygen scavenger composition (a) in the air-permeable packaging container (b1).

The step (II-1) corresponds to the above step (II), and is a step of supplying water through the air-permeable packaging container (b1) to the oxygen scavenger composition (a) and obtaining the oxygen scavenger composition (A).

Here, a method of supplying water through the air-permeable packaging container (b1) to the oxygen scavenger composition (a) is not especially limited, but includes, for example, a method in which by bringing a hydrous body (for example, moistened absorbent cotton or the like) into contact with an outer side of the air-permeable packaging container (b1) accommodating the oxygen scavenger composition (a), water contained in the hydrous body is supplied through (by being passed through) the air-permeable packaging container (b1) to the oxygen scavenger composition (a). Because this step is present, the resulting oxygen scavenger composition (A) easily forms the water film having a desired thickness.

It is preferable that such a method 1 further comprises the following step (IV-1).

Step (IV-1): a step of further accommodating the air-permeable packaging container (b1) in which the oxygen scavenger composition (A) is accommodated into a gas barrier container (b2).

The step (IV-1) is a step of further accommodating the air-permeable packaging container (b1) in which the oxygen scavenger composition (A) is accommodated into a gas barrier container (b2). Since the oxygen scavenger composition (A) is excellent in the oxygen absorption performance, it is preferable that the oxygen scavenger composition (A) is accommodated in the gas barrier container until being used as an oxygen scavenger.

Method 2

It is preferable that a method 2 comprises, following the above step (I), the following step (III-2), step (IV-2) and step (II-2) in this order.

Step (III-2): a step of accommodating the oxygen scavenger composition (a) and a moisture imparting agent in the air-permeable packaging container (b1)

Step (IV-2): a step of further accommodating the air-permeable packaging container (b1) in which the oxygen scavenger composition (a) and the moisture imparting agent are accommodated into a gas barrier container (b2)

Step (II-2): a step of supplying water from the moisture imparting agent to the oxygen scavenger composition (a) to obtain the oxygen scavenger composition (A)

The step (III-2) corresponds to the above step (III), and is a step of accommodating the oxygen scavenger composition (a) in the air-permeable packaging container (b1), but is a step of, at this time, accommodating a moisture imparting agent together with the oxygen scavenger composition (a) in the air-permeable packaging container (b1). By the present step, a self-reaction type oxygen scavenger can be obtained.

Here, as the moisture imparting agent, the above-mentioned one can be used.

The step (IV-2) is a step of further accommodating the air-permeable packaging container (b1) in which the oxygen scavenger composition (a) and the moisture imparting agent are accommodated into a gas barrier container (b2). By further accommodating the air-permeable packaging container (b1) in which the oxygen scavenger composition (a) and the moisture imparting agent are accommodated into a gas barrier container (b2), the air permeation from and to the outside can be blocked. As a result, water can effectively be supplied from the moisture imparting agent to the oxygen scavenger composition (a), and the oxygen scavenger composition (A) having the water film having a desired thickness formed thereon can be obtained (corresponding to the step (II-2)). Further, as described above, when moisture is supplied to the iron, the oxygen scavenging reaction slowly progresses, but due to that the air permeation from and to the outside is blocked by the gas barrier container, the oxygen absorption performance can well be maintained until the use time as an oxygen scavenger.

Hitherto, embodiments of the present invention have been interpreted, but the present invention is not limited to the above embodiments, and includes every aspect included in the concept and claims of the present invention, and various changes and modifications can be made within the scope of the present invention.

EXAMPLES

Hereinafter, the present embodiment will be described in detail by way of Examples and Comparative Examples, but the present embodiment may suitably be changed as long as the operation and effect of the present invention are attained. Various measurements in Example and Comparative Example were carried out as follows.

Average Particle Diameter

The average particle diameter was measured by one method among the following.

The D50 diameter was measured by using a laser diffraction scattering type particle size distribution analyzer.

The average particle diameter (D50) at a cumulative frequency of 50% in a volume-based particle size distribution was measured by using a laser diffraction scattering type particle size distribution analyzer ("LA-960", manufactured by HORIBA Ltd.).

The D50 diameter was determined by measuring a particle size distribution by classification.

An average particle diameter (D50) of a cumulative frequency of 50% was measured from weight fractions by sizes of sieve openings after vibration for 5 min by using standard sieves according to ISO 3310-1:2000 (equivalent to JIS Z8801-1:2006).

Specific Surface Area

The specific surface area was determined by measuring the amount of nitrogen adsorbed by using a specific surface area analyzer using the constant volume method ("BELSORP mini II", manufactured by MicrotracBell Corp.) under the following condition, and calculating the specific surface area by the BET method.

Measurement temperature: −196° C.

Pretreatment: 300° C., 3 hours, nitrogen circulation

Air Resistance

The air resistance was measured three times by using a digital Oken type air permeability tester ("EG02", manufactured by Asahi Seiko Co. Ltd.). The arithmetic average value of the obtained results was taken as a measurement result.

Example 1

(1) 0.25 g of sodium chloride (NaCl) was dissolved in 6 g of water, and this aqueous solution (NaCl concentration: 4% by mass) was mixed with 100 g of a reduced iron powder (manufactured by Hoganas AB, average particle diameter: 80 μm (D50 diameter measured by a laser diffraction scattering type particle size distribution analyzer), specific surface area: 0.085 $m^2/g$), and dried to cause sodium chloride to deposit on the surface of the iron powder to thereby obtain an iron powder whose surface was coated with sodium chloride (oxygen scavenger composition (a)).

(2) 1.00 g of the oxygen scavenger composition (a) obtained in the above (1) was filled in a bag (air-permeable packaging container (b1)) of 40 mm×40 mm using an air-permeable laminated film (constitution: polyethylene-made nonwoven fabric ("Eleves", manufactured by Unitika Ltd.)/oil-resistant synthetic paper ("Alt", manufactured by Awa Paper & Technological Co., Inc.), air resistance: 10 seconds, thickness: 200 μm), and three sides were sealed to thereby obtain an oxygen scavenger package (x1)).

(3) The oxygen scavenger package (x1) obtained in the above (2) and an absorbent cotton having absorbed water (absorbent cotton: 3.5 g, water: 5.0 g) were introduced in an aluminum three-sided bag (gas barrier container (b2), fabricated by cutting "700 aluminum bag", manufactured by Sun A Kaken Co. Ltd., into 180 mm×250 mm); the bag inside was replaced by nitrogen gas so that the oxygen concentration in the bag became 0.1% by volume or less; and the mouth of the bag was heat sealed to thereby obtain an oxygen scavenger package (y1).

(4) The oxygen scavenger package (y1) obtained in the above (3) was stored at 25° C. for 4 days to cause water to be supplied from the absorbent cotton having absorbed water (hydrous body) to the oxygen scavenger composition (a) to thereby obtain an oxygen scavenger composition (A) containing the iron, the metal salt and water, and an oxygen scavenger package (x2) in which the oxygen scavenger composition (A) is accommodated in the air-permeable packaging container (b1). Then, after the above storage period, in the aluminum three-sided bag, the absorbent cotton and the oxygen scavenger package (x2) were separated; and the portion of the oxygen scavenger package (x2) was cut off together with the aluminum three-sided bag; and the cut mouth was again heat sealed to thereby obtain an oxygen scavenger package (y2) accommodating the oxygen scavenger package (x2) in the aluminum three-sided bag (gas barrier container (b2)).

On the resulting oxygen scavenger package (y2), the following oxygen scavenging experiment was carried out, and the oxygen absorption performance was evaluated.

(5) Then, the content of water per unit surface area of the iron present on the surface of the iron, [the content of water present on the surface of the iron (g)/{the content of the iron (g)×the specific surface area of the iron ($m^2/g$)}], in the oxygen scavenger composition (A) was determined by the following method.

First, the weight $W_1$ of the oxygen scavenger package (x1) right after the fabrication (before absorbing water) was in advance measured.

Then, there was measured the weight $W_2$ of the oxygen scavenger package (y2) accommodating the oxygen scavenger package (x2) obtained by supplying water to the oxygen scavenger package (x1) in the aluminum three-sided bag (gas barrier container (b2)).

Further, there was measured the weight $W_3$ of the aluminum three-sided bag (gas barrier container (b2)) remaining when in the oxygen scavenging experiment described later, the oxygen scavenger package (x2) was taken out from the oxygen scavenger package (y2).

Here, the above each weight was measured by using a precision balance.

Then, since when the oxygen scavenger package (x2) was taken out from the aluminum three-sided bag, it was checked for that there was no dew condensate outside and inside the packaging material, the entire of the water content calculated by the following expression (1) could be presumed to be the amount of water supplied from the absorbent cotton having absorbed water to the surface of the iron of the oxygen scavenger composition (a), that is, the content of water present on the surface of the iron in the oxygen scavenger composition (A).

Therefore, from the water content calculated by the following expression (1), and the content and the specific surface area of the iron in the oxygen scavenger composition (A), there was calculated the content of water per unit surface area of the iron present on the surface of the iron, [the content of water present on the surface of the iron (g)/{the content of the iron (g)×the specific surface area of the iron ($m^2/g$)}]. The results are shown in Table 1.

$$\text{Water content (g)} = W_2 - W_1 - W_3 \tag{1}$$

Examples 2 to 12 and Comparative Examples 1 to 4

In Examples 2 to 12 and Comparative Examples 1 to 4, oxygen scavenger compositions (A) and oxygen scavenger packages (y2) were fabricated by the same method as in Example 1, except for altering the iron powder, the metal salt and storage days to those indicated in Table 1.

On the resulting oxygen scavenger packages (y2), the same measurements as in Example 1 and the following evaluations were carried out. The results are shown in Table 1.

Evaluations

By using each of the oxygen scavenger packages (y2) fabricated in Examples 1 to 12 and Comparative Examples 1 to 4, the following evaluations were carried out. The results are shown in Table 1.

Oxygen Scavenging Experiment

First, on one face of a PTS bag fabricated by cutting a PTS bag being a gas barrier bag (ceramic-deposited plastic film bag, "PB600700P", 600 mm×700 mm, thickness: 0.11 mm, manufactured by Mitsubishi Gas Chemical Co. Ltd.) into a size of 300 mm×350 mm, a rubber sheet for sampling (25 mm×25 mm, thickness: 2 mm) was adhered to thereby obtain a PTS bag for measurement.

Then, on a position corresponding to the rubber sheet for sampling of the PTS bag for measurement on one face of an aluminum bag fabricated by cutting an aluminum bag which is a gas barrier bag higher in the gas barrier properties (aluminum foil laminate plastic film bag, "700 Aluminum Bag", 700 mm×800 mm, thickness: 0.12 mm, manufactured by Sun A Kaken Co. Ltd.) into a size of 350 mm×400 mm, a rubber sheet for sampling (25 mm×25 mm, thickness: 2 mm) was adhered to thereby obtain an aluminum bag for measurement.

In the above PTS bag for measurement, 3,000 mL of air and the oxygen scavenger package (y2) were accommodated, and the opening was heat sealed. The oxygen concentration (initial oxygen concentration) in the PTS bag at this time was measured.

Then, in the PTS bag, the oxygen scavenger package (y2) was opened, and the oxygen scavenger package (x2) was taken out from the inside, and accommodated together with the PTS bag in the aluminum bag for measurement; and the opening was heat sealed. At this time, the PTS bag and the aluminum bag were arranged so that the rubber sheet for sampling of the PTS bag and the rubber sheet for sampling of the aluminum bag overlapped each other, and adhered with a double-faced tape so the rubber sheets as not to be out of overlapping.

The PTS bag together with the aluminum bag was quickly put in a thermostatic chamber at 25° C., and held for 7 days. At respective elapsed holding times of 2 hours and 7 days, the oxygen concentration in the PTS bag was measured.

Then, the oxygen concentration was measured by using a gas analyzer ("CheckMate 3", manufactured by Mocon, Inc.). The measurement was carried out by inserting a hollow needle on the tip of a silicone tube for sampling attached to the gas analyzer into the PTS bag inside through the rubber sheets for sampling in advance affixed on the PTS bag and the aluminum bag, and measuring the oxygen concentration.

From the measurement result of the oxygen concentration, the amount (mL/g) of oxygen absorption per iron powder weight in the PTS bag was calculated.

In the present Examples, the case where the amount of oxygen absorption per iron powder weight after 2 hours was 15 mL/g or more, and the case where the amount of oxygen absorption per iron powder weight after 7 days was 50 mL/g or more were judged to be the oxygen absorption performance being good, respectively. Then, a larger amount of oxygen absorption per iron powder weight after 2 hours means a faster initial oxygen absorption rate; and a larger amount of oxygen absorption per iron powder after 7 days means that the total amount of oxygen absorption is larger and a higher oxygen absorption performance can be exhibited.

TABLE 1

| | Iron powder | | | | Content of water per iron unit | Amount of oxygen absorption per iron weight | |
|---|---|---|---|---|---|---|---|
| | Type — | Specific surface area $m^2/g$ | Metal salt | Storage days days | surface area present on surface of iron $g/m^2$ | after 2 hours mL/g | after 7 days mL/g |
| Example 1 | Reduced | 0.085 | NaCl | 2 | 0.94 | 23 | 85 |
| Example 2 | iron | | | 4 | 2.00 | 18 | 165 |
| Comparative Example 1 | powder | | | 8 | 2.71 | 4 | 80 |
| Example 3 | | | NaBr | 2 | 0.71 | 20 | 80 |
| Example 4 | | | | 4 | 1.88 | 18 | 180 |
| Comparative Example 2 | | | $CaCl_2$ | 2 | 0.47 | 18 | 39 |
| Example 5 | | | | 8 | 1.88 | 25 | 150 |
| Example 6 | | | $CaBr_2$ | 4 | 0.82 | 18 | 78 |
| Example 7 | | | | 8 | 1.53 | 15 | 130 |
| Example 8 | Atomized | 0.073 | $CaBr_2$ | 4 | 1.11 | 30 | 95 |
| Example 9 | iron | | | 8 | 1.85 | 25 | 136 |
| Comparative Example 3 | powder 1 | | | 16 | 2.40 | 10 | 149 |
| Example 10 | | | NaCl | 2 | 1.97 | 32 | 126 |
| Example 11 | Atomized | 0.035 | $CaBr_2$ | 1 | 1.27 | 22 | 52 |
| Comparative Example 4 | iron | | | 4 | 2.19 | 8 | 90 |
| Example 12 | powder 2 | | NaCl | 1 | 1.99 | 15 | 65 |

Components in Table 1 are shown below.

Reduced iron powder: manufactured by Hoganas AB, average particle diameter: 80 μm (D50 diameter measured by a laser diffraction scattering type particle size distribution analyzer), specific surface area: 0.085 $m^2/g$ Atomized iron powder 1: a passing fraction obtained by sieving an atomized iron powder (manufactured by KOBE Steel, Ltd., average particle diameter: 75 μm (D50 diameter determined by measuring a particle size distribution by classification)) through a sieve of 45 μm in opening, specific surface area: 0.073 $m^2/g$ Atomized iron powder 2: a residual fraction obtained by sieving the same atomized iron powder through a sieve of 180 μm in opening, and sieving a passing fraction thereof through a sieve of 150 μm in opening, specific surface area: 0.035 $m^2/g$ NaCl: sodium chloride NaBr: sodium bromide $CaCl_2$): calcium chloride $CaBr_2$: calcium bromide As indicated in Table 1, it was confirmed that in the oxygen scavenger compositions in which the content of water per unit surface area of the iron present on the surface of the iron, [the content of water present on the surface of the iron] (g)/{the content of the iron (g)×the specific surface area of the iron ($m^2/g$)}], was in the range of 0.60 $g/m^2$ or more and 2.00 $g/m^2$ or less, the oxygen absorption rate at the reaction initial stage was fast and a high oxygen absorption performance was exhibited (Examples 1 to 12).

By contrast, it was confirmed that in the oxygen scavenger compositions in which the content of water per unit surface area of the iron present on the surface of the iron exceeded 2.00 $g/m^2$, the oxygen absorption rate at the reaction initial stage was slow (Comparative Examples 1, 3 and 4). Further, it was confirmed that in the oxygen scavenger compositions in which the content of water per unit surface area of the iron present on the surface of the iron was less than 0.60 $g/m^2$, the oxygen absorption rate at the reaction initial stage was relatively fast, but the amount of oxygen absorption decreased due to moisture shortage, and a sufficient oxygen absorption performance was not exhibited (Comparative Example 2).

The invention claimed is:

1. An oxygen scavenger composition, comprising iron, a metal salt, and water, wherein a content of water per unit surface area of the iron present on the surface of the iron, [a content of water present on the surface of the iron] (g)/{a content of the iron (g)×a specific surface area of the iron ($m^2/g$)}], is 0.60 $g/m^2$ or more and 2.00 $g/m^2$ or less.

2. The oxygen scavenger composition according to claim 1, wherein at least a part of the metal salt is present on the surface of the iron.

3. The oxygen scavenger composition according to claim 2, wherein the metal salt present on the surface of the iron is disposed so as to coat the surface of the iron.

4. The oxygen scavenger composition according to claim 2, wherein the metal salt present on the surface of the iron is one or more selected from the group consisting of calcium chloride, sodium chloride, calcium bromide and sodium bromide.

5. The oxygen scavenger composition according to claim 2, wherein a content of the metal salt present on the surface of the iron is, with respect to 100 parts by mass of the iron, 0.1 part by mass or more and 5.0 parts by mass or less.

6. The oxygen scavenger composition according to claim 1, wherein a specific surface area of the iron is 0.03 $m^2/g$ or more and 0.20 $m^2/g$ or less.

7. The oxygen scavenger composition according to claim 1, wherein an average particle diameter (D50) of the iron is 1 μm or more and 1,000 μm or less.

8. An oxygen scavenger package, comprising an oxygen scavenger composition according to claim 1, and an air-permeable packaging container in which the oxygen scavenger composition is accommodated.

9. A method for producing an oxygen scavenger package, comprising the following steps (I) to (III):

step (I): a step of obtaining an oxygen scavenger composition (a) containing a metal salt and iron;

step (II): a step of supplying water to the oxygen scavenger composition (a) and obtaining an oxygen scavenger composition (A) containing the iron, the metal salt and water, wherein a content of water per unit surface area of the iron present on the surface of the iron, [a content of water present on the surface of the iron] (g)/{a content of the iron (g)×a specific surface area of the iron ($m^2/g$)}], is 0.60 $g/m^2$ or more and 2.00 $g/m^2$ or less; and step (III): a step of accommodating at least one of the oxygen scavenger composition (a) and the oxygen scavenger composition (A) in an air-permeable packaging container (b1).

10. The method for producing an oxygen scavenger package according to claim 9, comprising, following the step (I), the following step (III-I) and step (II-1) in this order:

step (III-1): a step of accommodating the oxygen scavenger composition (a) in the air-permeable packaging container (b1); and step (II-1): a step of supplying water to the oxygen scavenger composition (a) through the air-permeable packaging container (b1) and obtaining the oxygen scavenger composition (A).

11. The method for producing an oxygen scavenger package according to claim 10, further comprising the following step (IV-1):

step (IV-1): a step of further accommodating the air-permeable packaging container (b1) in which the oxygen scavenger composition (A) is accommodated into a gas barrier container (b2).

12. The method for producing an oxygen scavenger package according to claim 9, comprising, following the step (I), the following step (III-2), step (IV-2) and step (II-2) in this order:

step (III-2): a step of accommodating the oxygen scavenger composition (a) and a moisture imparting agent in the air-permeable packaging container (b1);

step (IV-2): a step of further accommodating the air-permeable packaging container (b1) in which the oxygen scavenger composition (a) and the moisture imparting agent are accommodated into a gas barrier container (b2); and step (II-2): a step of supplying water from the moisture imparting agent to the oxygen scavenger composition (a), and obtaining the oxygen scavenger composition (A).

* * * * *